United States Patent
Kurihara et al.

(10) Patent No.: US 11,226,606 B2
(45) Date of Patent: Jan. 18, 2022

(54) GENERATION METHOD OF CONTROL PROGRAM FOR MACHINE INCLUDING INPUT/OUTPUT APPARATUS, PROGRAM GENERATION APPARATUS, AND ELECTRIC DEVICE USED FOR GENERATION METHOD OF CONTROL PROGRAM

(71) Applicant: FANUC CORPORATION, Yamanashi (JP)

(72) Inventors: Kenichiro Kurihara, Yamanashi (JP); Shinichi Kuwahata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/931,321

(22) Filed: Jul. 16, 2020

(65) Prior Publication Data
US 2021/0080918 A1    Mar. 18, 2021

(30) Foreign Application Priority Data
Sep. 17, 2019    (JP) .............................. JP2019-168775

(51) Int. Cl.
  *G05B 19/05*    (2006.01)
(52) U.S. Cl.
  CPC ......... *G05B 19/054* (2013.01); *G05B 19/056* (2013.01); *G05B 19/058* (2013.01)
(58) Field of Classification Search
  CPC ... G05B 19/054; G05B 19/056; G05B 19/058

USPC .......................................................... 700/12
See application file for complete search history.

(56) References Cited

U.S. PATENT DOCUMENTS

| 2015/0058502 | A1* | 2/2015 | Seki .................... G06F 13/20 710/19 |
| 2016/0062342 | A1* | 3/2016 | Kubo ................... G05B 19/414 700/170 |
| 2020/0125060 | A1* | 4/2020 | Fujimura ............. G05B 19/056 |

FOREIGN PATENT DOCUMENTS

| JP | 20112868 A | 1/2011 |
| JP | 201354637 A | 3/2013 |
| JP | 2014137621 A | 7/2014 |

* cited by examiner

*Primary Examiner* — Jigneshkumar C Patel
(74) *Attorney, Agent, or Firm* — Hauptman Ham, LLP (57) ABSTRACT

The program generation apparatus includes a terminal detection unit for detecting position information including a position of a first terminal of an input/output apparatus to which an electrical wiring is connected. A display control unit displays, on a display part, a control program and position information of the first terminal detected by the terminal detection unit. The operation detection unit detects a symbol indicating the device specified by the operator. The setting unit allocates the position of the first terminal which is included in the position information of the first terminal to the symbol which is indicative of the device which has been detected by the operation detection unit.

8 Claims, 10 Drawing Sheets

| FIRST INPUT/OUTPUT APPARATUS | INPUT/OUTPUT UNIT | TERMINAL 1 | X100.0 | FIRST SENSOR |
|---|---|---|---|---|
| | | TERMINAL 2 | Y50.0 | FIRST ACTUATOR |
| | OUTPUT UNIT | TERMINAL 1 | Y60.0 | SECOND ACTUATOR |
| | | TERMINAL 2 | Y60.1 | THIRD ACTUATOR |
| SECOND INPUT/OUTPUT APPARATUS | INPUT UNIT | TERMINAL 1 | X80.0 | SECOND SENSOR |
| | | TERMINAL 2 | X80.1 | THIRD SENSOR |
| | | TERMINAL 3 | X80.2 | FOURTH SENSOR |

GENERATION METHOD OF CONTROL PROGRAM FOR MACHINE INCLUDING INPUT/OUTPUT APPARATUS, PROGRAM GENERATION APPARATUS, AND ELECTRIC DEVICE USED FOR GENERATION METHOD OF CONTROL PROGRAM

RELATED APPLICATIONS

The present application claims priority to Japanese Application Number 2019-168775, filed Sep. 17, 2019, the disclosure of which is hereby incorporated by reference herein in its entirety.

BACKGROUND OF THE INVENTION

1. Field of the Invention

The present invention relates to a generation method of a control program for a machine including an input/output apparatus, a program generation apparatus, and an electric device which is used for the generation method of the control program.

2. Description of the Related Art

In a machine such as a machine tool, a robot device, or the like, there is provided a controller in order to control a drive mechanism such as a motor which is included in the machine. An actuation command of the controller is transmitted to an electric circuit for supplying electric power to the drive mechanism, via an input/output apparatus. Alternatively, a signal from a sensor or the like attached to the machine is input to the controller via the input/output apparatus.

The controller can transmit an actuation command of the drive mechanism or receive a signal from a sensor or the like, based on a control program. For example, the controller includes a programmable logic controller (PLC). The programmable logic controller controls sequence of the drive of the drive mechanism and reception of signals from the sensor or the like. The programmable logic controller is driven based on a control program which is referred to as a ladder diagram (e.g., Japanese Unexamined. Patent Publication. No. 2014-137621A and Japanese Unexamined Patent Publication No. 2011-2868A).

The input/output apparatus includes a terminal to which an electrical wiring for transmitting a signal to the electric circuit of the drive mechanism is connected. Alternatively, the input/output apparatus includes a terminal to which an electrical wiring for receiving a signal from a sensor or the like is connected. The input/output apparatus has plurality of terminals provided therein. An address is set to each terminal as information for identifying the position of the terminal. The control program has specified therein an address, together with a device which is included in the machine. In other words, the control program has specified therein the position of the terminal of the input/output apparatus to which each device is connected. (e.g., Japanese Unexamined. Patent Publication. No. 2013-54637A).

SUMMARY OF INVENTION

In the related art, when generating a control program, an input device such as a detection unit and an output device such as a drive mechanism to be controlled are selected firstly. Next, an address of a terminal of the input/output apparatus is allocated to each device of the input device and the output device. Next, an operator generates a control program which includes each device. On this occasion, the control program is generated by using the allocated address of the terminal in the input/output apparatus. In other words, the position of the terminal to which each device is connected has been determined at the start of generation of the control program.

The operator completes the control program before connecting the electrical wiring to the input/output apparatus. Subsequently, the operator performs connection of the actual device, based on the address which is specified in the control program. The operator connects the input device and the output device to the input/output apparatus based on the control program.

As described above, the operator determines the device to be connected to the terminal of the input/output apparatus before connecting the electrical wiring. Accordingly, there has been a case where actually connecting the device to the input/output apparatus causes the electrical wiring to be arranged in a complicated manner. For example, there has been a case where a plurality of electrical wirings get entangled or cross with each other in a complicated manner. When allocating an address of a terminal in the control program, it often happens that an address is allocated without taking into account the position of the input/output apparatus and the positions of other apparatuses on a control panel. Accordingly, there has been a case where actually connecting the electrical wiring causes the electrical wiring to be arranged in a complicated manner. As a result, there has been a case where the space for arranging the electrical wiring increases.

In addition, there has been a problem that, since it is impossible to modify the address after having performed connection of the electrical wiring, the device described in the control program must be connected to the terminal of the address which is specified in the control program.

A first aspect of the present disclosure is a generation method of a control program by which a controller performs control of a machine via an input/output apparatus. The generation method of the control program includes a step of connecting, by an operator, a second terminal of an electrical wiring to at least one of first terminals of an input/output apparatus. The generation method of the control program includes a step of detecting, by an arithmetic processing device, position information which includes a position of one of the first terminals to which the second terminal is connected. The generation method of the control program includes a step of displaying, on a display part by the arithmetic processing device, position information of the first terminal, and at least one of the control program and a table of symbols which are indicative of devices which are included in the control program. The generation method of the control program includes a step of selecting, by the operator, a symbol which is indicative of a device which corresponds to the position information of the first terminal, among the symbols which are indicative of the devices which are included in the control program. The generation method of the control program includes a step of allocating, by the arithmetic processing device, the position of the first terminal which is included in the position information of the first terminal to the symbol which is indicative of the device selected by the operator.

A second aspect of the present disclosure is a program generation apparatus configured to generate a control program for performing control by using an input/output apparatus configured to perform at least one of an input of a signal and an output of a signal. The program generation apparatus includes an arithmetic processing device that has a display part and an input part for accepting an operation which has been performed by an operator on a screen of the display part and that communicates with the input/output apparatus. Inc input/output apparatus includes a plurality of first terminals to each of which a second terminal of an electrical wiring is connected. The arithmetic processing device includes an operation detection unit for detecting an operation which has been performed by the operator on the input part, and a display control unit for controlling the display part. The arithmetic processing device includes a terminal detection unit for detecting position information which includes a position of one of the first terminals of the input/output apparatus to which an electrical wiring is connected, and a setting unit for setting a position of the first terminal to which a device that is indicated in the control program is connected. The display control unit displays, on the display part, at least one of the control program and a table of symbols which are indicative of the devices which are included in the control program, and the position information of the first terminal which has been detected by the terminal detection unit. The operation detection unit detects a symbol which corresponds to the position information of the first terminal and indicative of the device which is specified by the operator. The setting unit allocates the position of the first terminal which is included in the position information of the first terminal to the symbol which is indicative of the device which has been detected by the operation detection unit.

A third aspect of the present disclosure is an electric device which is formed to be communicable with a program generation apparatus for generating a control program. The electric device includes a control unit having at least one of a function of converting a signal from an input device into a signal to be transmitted to a controller and a function of converting a signal from the controller into a signal to be transmitted to an output device. The electric device includes a plurality of first terminals to which a second terminal of an electrical wiring is connected, and a plurality of buttons which are arranged so as to correspond to each of the first terminals. The control unit is formed so as to transmit, to the program generation apparatus by pressing a button by an operator, position information which includes the position of the first terminal which corresponds to the button.

DETAILED DESCRIPTION

With reference to FIG. 1 to FIG. 10, a generation method of a control program, a program generation apparatus, and an electric device which is used for the control program generation method of an embodiment will be described. In the present embodiment, although a machine tool is taken as an example of a machine, the generation method of the control program, the program generation apparatus, and the electric device of the present embodiment can be applied to any industrial machine, without being limited to this embodiment.

Figure 1:
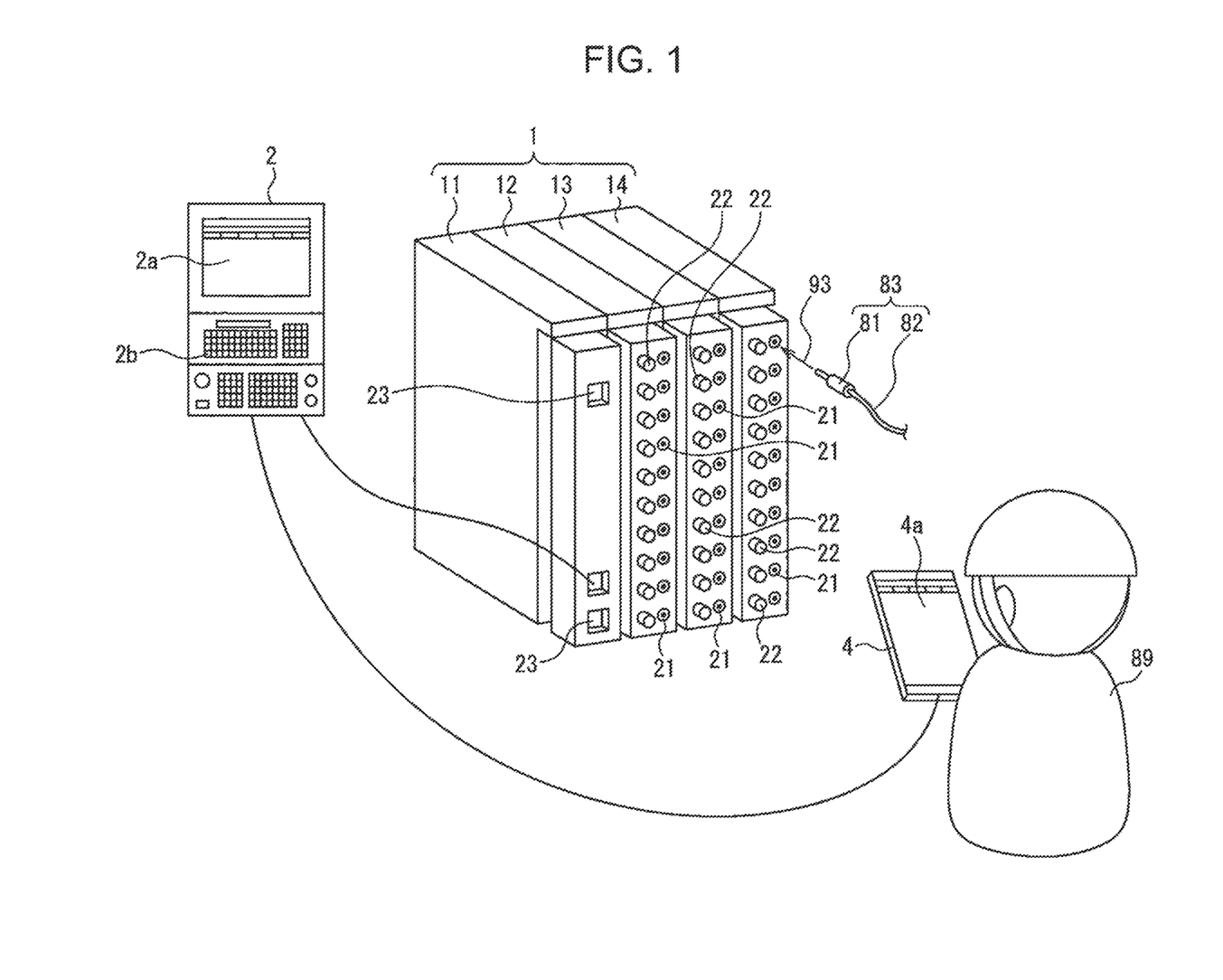
FIG. 1 is a perspective view of a controller, a first input/output apparatus, and a mobile device according to an embodiment.
Figure 2:
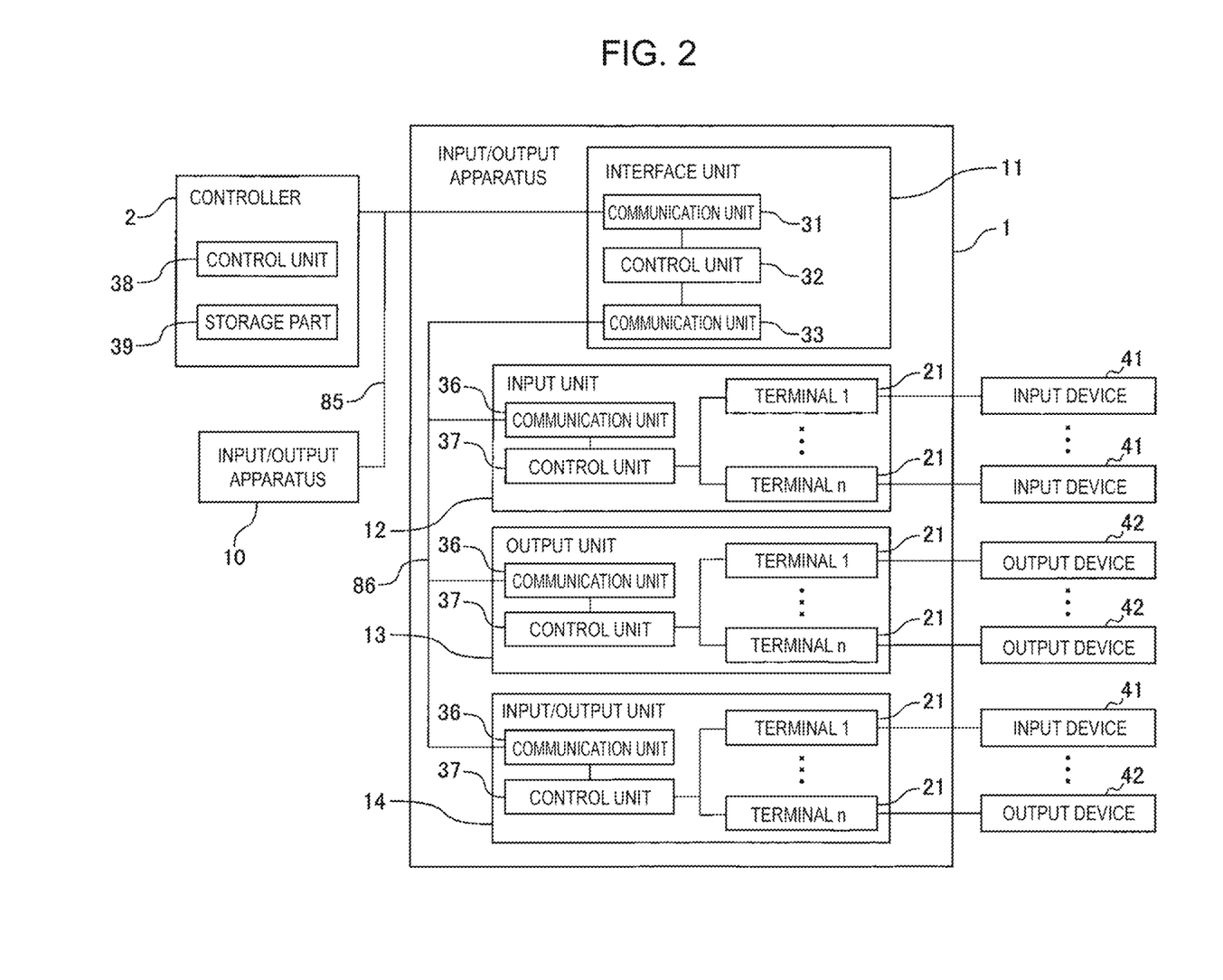
FIG. 2 is a block diagram of a controller and an input/output apparatus according to an embodiment.

FIG. 1 illustrates a schematic perspective view of a controller, a first input/output apparatus, and a mobile device in the present embodiment. FIG. 2 illustrates a block diagram of the controller and the input/output apparatus. With reference to FIG. 1 and FIG. 2, the main body of the machine has a controller 2 attached thereto. The controller 2 in the present embodiment is a numerical controller having a function of a programmable logic controller (PLC). With regard to the controller, it is possible to employ a controller that performs any control of the machine, without being limited to this embodiment.

The controller 2 has an arithmetic processing device (computer) which includes a CPU (Central Processing Unit) as a processor. The arithmetic processing device has a RAM (Random Access Memory), a ROM (Read Only Memory), or the like, which are mutually connected to the CPU via a bus.

The arithmetic processing device of the controller 2 includes a control unit 38 for performing control. The control unit 38 corresponds to a processor which is driven based on the control program. The controller 2 includes a storage part 39 for storing predetermined information. The storage part 39 stores information relating to control of the machine. The storage part 39 can be configured with a storage medium which can store information, such as a volatile memory, a nonvolatile memory, or a hard disk. The control program for controlling the machine tool is stored in the storage part 39.

The controller 2 has a display part 2a for displaying information relating to control, and an input part 2b for inputting arbitrary information. The input part 2b can be configured with an operating device such as a keyboard, a mouse, or the like. The display part 2a can be configured with an arbitrary display panel such as a liquid crystal display panel.

The machine includes a control panel having provided thereon a device for performing control. The control panel has provided therein input/output apparatuses 1 and 10. The controller 2 performs control of the machine via the input/output apparatus 1. The first input/output apparatus 1 in the present embodiment includes an input unit 12 for transmitting a signal to the controller 2. The input unit 12 has a function of receiving a signal from an input device 41 and converting the signal into a signal to be transmitted to the controller 2. As the input device 41, there may be exemplified a sensor for detecting temperature or velocity, a limit switch, a selection switch, or the like.

The input/output apparatus 1 in the present embodiment includes an output unit 13 for outputting a signal from the controller 2. The output unit 13 has a function of converting an actuation command from the controller 2 into a signal to be transmitted to an output device 42. As the output device 42, there may be exemplified an amplifier for driving a motor or the like, an electromagnetic relay, an electromagnetic valve, a lamp, and a relay.

The input/output apparatus 1 of the present embodiment includes an input/output unit 14 for transmitting a signal to the controller 2 and receiving a signal from the controller 2. The input/output unit 14 has a function of converting a signal from the controller 2 and transmitting the signal to the output device 42, or converting a signal from the input device 41 and transmitting the signal to the controller 2.

Each unit of the input unit 12, the output unit 13, and the input/output unit 14 is an electric device for performing at least one of inputting and outputting a signal. In particular, each of the input unit 12, the output unit 13, and the input/output unit 14 functions as a signal conversion device for converting a signal. The unit surface of each of the input unit 12, the output unit 13, and the input/output unit 14 has arranged thereon a plurality of first terminals 21. In the example illustrated in FIG. 1, each of the units 12, 13, and 14 has ten of the first terminals 21 formed thereon. An electrical wiring 83 which is connected to a device such as an input device includes a cable 82 and a second terminal 81 which is connected to the cable 82. The second terminal 81 is inserted into the first terminals 21 formed on each of the units 12, 13, and 14, as indicated by an arrow 93.

Each unit of the input unit 12, the output unit 13, and the input/output unit 14 includes a communication unit 36 for communicating with another unit, and a control unit 37 configured to perform a signal conversion process. The communication unit 36 and the control unit 37 are configured with an LSI (Large Scale Integration) or a CPU as a processor, for example. In a case where the communication unit 36 and the control unit 37 are configured with a CPU, each of the communication unit 36 or the control unit 37 corresponds to a CPU which is driven in accordance with an operation program.

The input/output apparatus 1 includes an interface unit 11 for communicating with the controller 2. The surface of the interface unit has formed thereon a terminal 23 for connecting a communication line. The interface unit 11 includes a communication unit 33 for communicating with the input unit 12, the output unit 13, and the input/output unit 14, and a communication unit 31 for communicating with the controller 2. Furthermore, the interface unit 11 includes a control unit 32 for processing a signal. The communication units 31 and 33, and the control unit 32 may be configured with an LSI or a CPU as a processor, for example. In a case where the communication units 31 and 33 and the control unit 32 are configured with a CPU, each of the communication units 31 and 33 or the control unit 32 corresponds to a CPU which is driven in accordance with the operation program.

The interface unit 11 performs communication with the controller 2 via a communication path 85. The interface unit 11 performs communication with the input unit 12, the output unit 13, and the input/output unit 14, via the communication path 86.

Accordingly, the input/output apparatus 1 receives an actuation command from the controller 2, and transmits a signal to the output device 42 in addition, the input/output apparatus 1 receives a signal from the input device 41 and transmits the signal to the controller 2.

In the example illustrated in FIG. 2, the first input/output apparatus 1 includes a single body of the input unit 12, a single body of the output unit 13, and a single body of the input/output unit 14, but the embodiment is not limited to this. It suffices for the input/output apparatus 1 to include at least one of the input unit, the output unit, and the input/output unit. Alternatively, any of the input unit, the output unit, and the input/output unit may have the function of the interface unit.

In addition, the controller 2 may include the functions of the input unit, the output unit, and the input/output unit. In this case, a first terminal is formed on the controller 2 so as to connect thereto at least one device of the input device 41 and the output device 42. Communication between each unit can be performed by internal communication in the controller.

Furthermore, the controller 2 may have a plurality of input/output apparatuses which are connected thereto. In the example illustrated in FIG. 2, the controller 2 has the input/output apparatus 1 and an input/output apparatus 10 connected thereto. The configuration of the input/output apparatus 10 includes any type and any number of units, as with the configuration of the input/output apparatus 1. The controller 2 of the present embodiment performs communication with the input/output apparatus 1 and the input/output apparatus 10 via the communication path 85.

Each of the first terminals 21 which are arranged on the input unit 12, the output unit 13, and the input/output unit 14 of the input/output apparatus 1 has an address set thereto at the time of power-on as the position of each of the first terminals 21.

For example, the addresses of the input/output apparatuses 1 and 10 may be set by the operator. The controller 2 acquires the connection order of the input/output apparatuses 1 and 10. The control unit 32 of the interface unit 11 acquires the configuration of the input unit 12, the output unit 13, and the input/output unit 14, which are connected to the interface unit 11. For example, the control unit 32 acquires the model/spec and individual number of each of the units 12, 13, and 14. The control unit transmits the configuration of each of the units 12, 13, and 14 to the controller 2.

The controller 2 sets the addresses of the interface unit 11, the input unit 12, the output unit 13, and the input/output unit 14, based on the overall configuration of the input/output apparatuses 1 and 10. Furthermore, the controller 2 automatically sets an appropriate address for each of the terminals 21. The interface unit 11, the input unit 12, the output unit 13, and the input/output unit 14 acquire addresses allocated by the controller 2.

Note that any arbitrary address-setting method can be performed. For example, the operator may set an address of each unit and an address of each terminal. In this case, the operator can set the address from the input part 2b of the controller 2.

Next, a program generation apparatus in the present embodiment will be described. The program generation apparatus in the present embodiment can associate the address of each terminal 21 with the symbol which is indicative of the device that is described in the control program.

Figure 3:
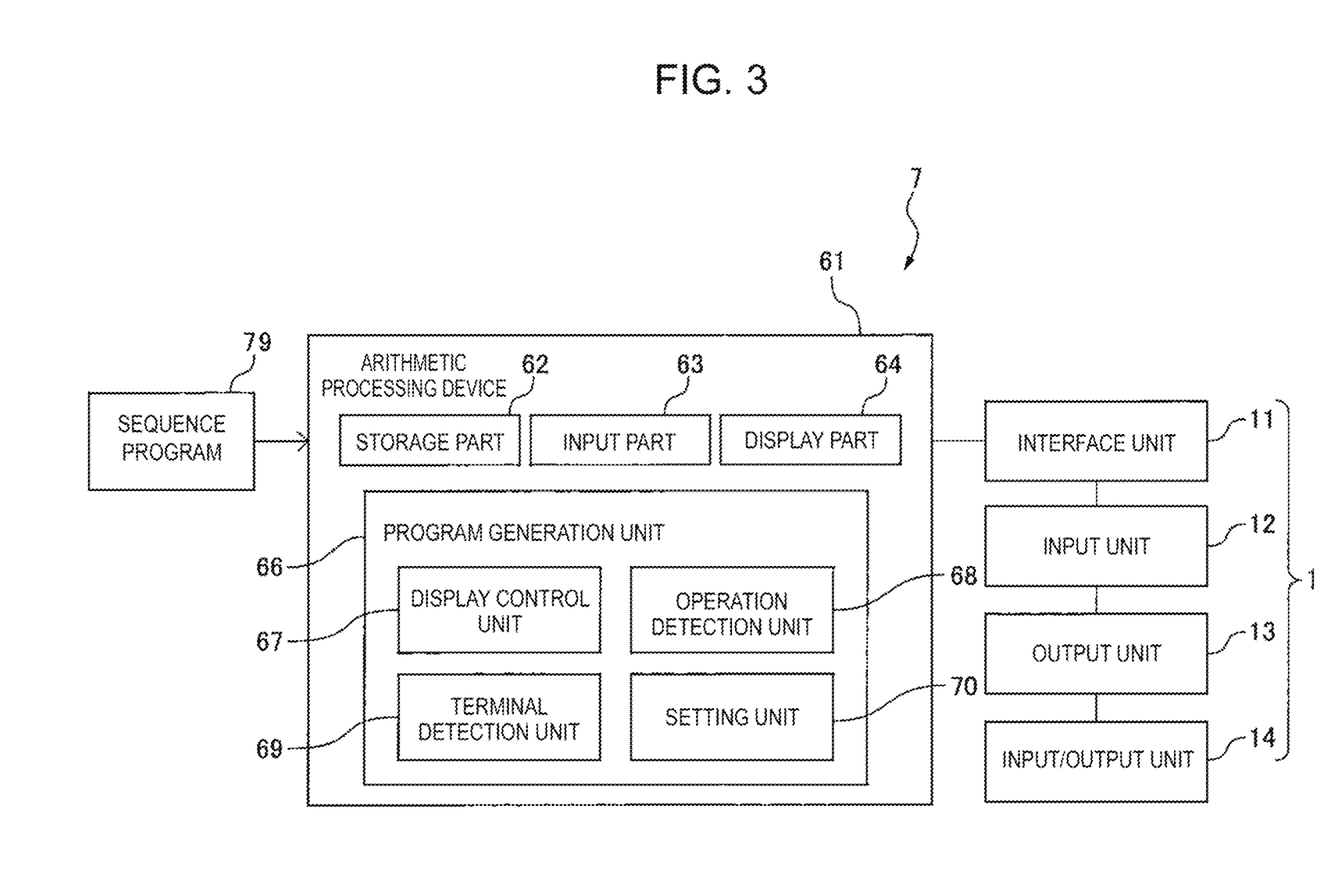
FIG. 3 is a block diagram of a first program generation apparatus according to an embodiment.

FIG. 3 illustrates a block diagram of a first program generation apparatus in the present embodiment. A program generation apparatus 7 in the present embodiment generates a control program for performing control by using the input/output apparatus 1 that performs at least one of an input of a signal and an output of a signal. Here, a control program will be described, taking a ladder diagram written in ID language as an example.

The first program generation apparatus 7 includes an arithmetic processing device 61. The arithmetic processing device 61 is configured with a computer that includes a CPU as a processor. With reference to FIG. 1, in the present embodiment, the program generation apparatus 7 includes a mobile device 4. The mobile device 4 of the present embodiment is a tablet. The mobile device 4 includes a display part 4a for displaying information relating to generation of the control program. The display part 4a of the present embodiment is configured with a touch panel type display panel. In the present embodiment, the mobile device 4 corresponds to the arithmetic processing device 61.

With reference to FIG. 3, the arithmetic processing device 61 has a storage part 62 for storing information relating to generation of the control program. The storage part 62 can be configured with a storage medium that can store information, such as a volatile memory, a non-volatile memory, or a hard disk. The arithmetic processing device 61 includes an input part 63 for inputting arbitrary information, and a display part 64 for displaying arbitrary information. The input part 63 is formed so as to accept a screen operation that has been performed by the operator on the display part 64. In the present embodiment, the display part 4a of the mobile device 4 functions as the input part 63 and the display 2a part 64.

The arithmetic processing device 61 performs mutual communication with the input/output apparatus 1. In the present embodiment, the mobile device 4 is connected to the controller 2 via a communication line. The mobile device 4 is formed so that it can communicate with the input/output apparatus 1 via the controller 2.

The arithmetic processing device 61 includes a program generation unit 66 for generating a program. The program generation unit 66 has a display control unit 67 for controlling the display part 64. In particular, the display control unit 67 controls, in accordance with an operation which has been performed by the operator on the input part 63, an image, a character string, or the like which are displayed on the display part 64. The arithmetic processing device 61 includes an operation detection unit 68 for detecting an operation which has been performed by the operator on the input part 63. The program generation unit 66 includes a terminal detection unit 69 for detecting position information including a position of one of the first terminals 21 of the input/output apparatus 1 to which the electrical wiring 83 is connected. The program generation unit 66 includes a setting unit 70 for setting the position of the first terminal 21 to which a device indicated in the ladder diagram is connected.

Each unit of the program generation unit 66, the display control unit 67, the operation detection unit 68, the terminal detection unit 69, and the setting unit 70 corresponds to a processor which is driven based on the operation program of the arithmetic processing device 61. The processor functions as each unit by reading the operation program which is stored in the storage part 62, and performing control which is defined in the operation program.

The arithmetic processing device 61 in the present embodiment includes the mobile device 4, but the embodiment is not limited to this. The arithmetic processing device 61 may be a desktop-type or laptop-type personal computer. In this case, an operating device such as a keyboard and a mouse corresponds to the input part 63. In addition, a display panel such as a liquid crystal display panel corresponds to the display part 64.

Alternatively, the arithmetic processing device 61 may be an arithmetic processing device which is included in the controller 2. In this case, the input part 63 of the arithmetic processing device 61 corresponds to the input part 2b of the controller 2. The display part 64 of the arithmetic processing device 61 corresponds to the display part 2a of the controller L. The storage part 62 of the arithmetic processing device 61 corresponds to the storage part 39 of the controller 2. The program generation unit 66 corresponds to the control unit 38 of the controller 2.

Figure 4:
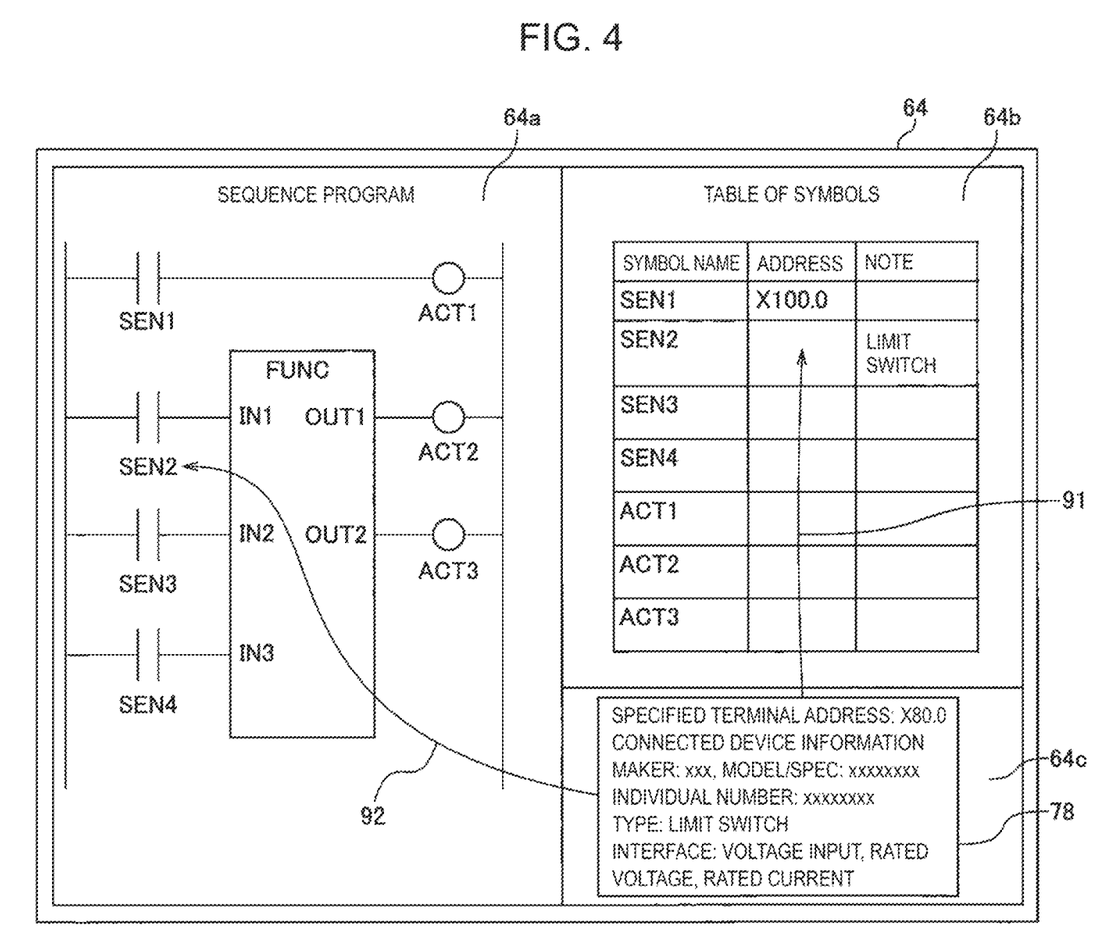
FIG. 4 is a first screen which is displayed on a display part of the mobile device.

FIG. 4 illustrates an example of a screen which is displayed on a display part of the arithmetic processing device of the program generation apparatus. In the example presented here, the screen of the display part 64 is divided into a first area. 64a, a second area 64b, and a third area 64c. With reference to FIGS. 3 and 4, the arithmetic processing device 61 has a sequence program 79 as a control program of the machine tool stored in the storage part 62. The sequence program 79 may be acquired from the controller 2, for example. The sequence program 79 of the present embodiment is a ladder diagram.

The display control unit 67 displays the sequence program on the first area 64a. In the sequence program in the present embodiment, the signals which correspond to their respective devices of the input device 41 and the output device 42 are indicated by symbols such as "SEN1" and "ACT1".

For example, the symbol SEN2 corresponds to the input device 41 which is connected to the input unit 12. The symbol ACT2 corresponds to the output device 42 which is connected to the output unit 13. The symbol SEN1 corresponds to the input device 41 which is connected to the input/output unit 14.

Here, the sequence program in the present embodiment includes a functional block which is indicated by the symbol FUNC. The functional block of the present embodiment corresponds to the control unit 38 of the controller 2. The control unit 36 can perform at least one of determination and arithmetic operation in the functional block.

The display control unit 67 displays, on the second area 64b, a table of symbols which are indicative of the devices which are included in the sequence program. The table of symbols includes a field of name of the symbol described in the sequence program, and a field of address of the terminal 21 of the input/output apparatus 1. The table of symbols is formed so as to associate symbols which are indicative of their respective devices and addresses.

The display control unit 67 in the present embodiment displays both the sequence program and the table of symbols which are indicative of the devices, but the embodiment is not limited to this. It suffices that the display control unit displays at least one of the sequence program and the table of symbols which are indicative of the devices.

In an initial state in which the arithmetic processing device 61 has acquired the sequence program, no address has been set which corresponds to a symbol which is indicative of each device. In other words, the field of address in the table of symbols is blank. The program generation unit 66 of the present embodiment has a function of compiling the sequence program. The program generation unit 66 sets an address which corresponds to a symbol which is indicative of each device in response to an operation which is performed by the operator.

In the generation method of the control program of the present embodiment, a process of connecting, by an operator 89, the second terminal 81 of the electrical wiring to at least one of the first terminals 21 of the input/output apparatus 1 is performed. Next, the arithmetic processing device 61 performs a process of detecting position information including the position of one of the first terminals 21 to which the second terminal 81 is connected. The arithmetic processing device 61 performs a process of displaying, on the display part, the position information of the first terminal 21, and at least one of the control program and the table of symbols which are indicative of the devices which are included in the control program. Next, a process is performed in which the operator 89 selects, from the symbols which are indicative of the devices which are included in the control program, a symbol which is indicative of the device which corresponds to the position information of the first terminal 21.

Subsequently, the arithmetic processing device 61 performs a process of allocating, to the symbol which is indicative of the device selected by the operator 89, the position of the first terminal which is included in the position information of the first terminal 21.

With reference to FIG. 1 and FIG. 2, in a first generation method of the control program of the present embodiment, firstly, to the first terminal 21 of the input/output apparatus 1, the electrical wiring 83 which is connected to a plurality of the input devices 41 and the output devices 42 is connected. For example, the electrical wirings 83 connected to all the input devices 41 and the output devices 42 are connected to the first terminals 21. As indicated by the arrow 93, the operator performs a task of connecting the second terminal 81 to the first terminal 21 of the input/output apparatus 1.

The first input/output apparatus 1 includes buttons 22 formed so as to correspond to their respective first terminals 21. Each of the buttons 22 is provided on the side of the first terminal 21. The buttons 22 are arranged in a one-to-one correspondence with the first terminals 21. In the present embodiment, the buttons 22 are formed for all the terminals 21 of the input unit 12, the output unit 13, and the input/output unit 14.

The control unit 37 of each of the units 12, 13, and 14 detects that the operator has pressed the button 22. The control unit 37 detects an address of the first terminal 21 which corresponds to the button. Subsequently, the position information including the address of the first, terminal 21 is transmitted to the arithmetic processing device 61 via the interface unit 11 and the controller 2. In other words, the control unit 37 transmits, by pressing the button 22 by the operator, the position information including the position of the first terminal 21 which corresponds to the button 22 to the arithmetic processing device 61.

The operator selects one of the first terminals 21, among the plurality of first terminals 21 to which the second terminals 81 are connected respectively. The operator presses the button 22 which is provided next to the selected first terminal 21. The input/output apparatus 1 transmits, to the arithmetic processing device 61, position information including the address of the first terminal 21 which corresponds to the button pressed by the operator.

With reference to FIG. 3 and FIG. 4, the terminal detection unit 69 receives a signal from the input/output apparatus 1. The terminal detection unit 69 detects position information 78 including the position of one of the first terminals 21 of the input/output apparatus 1 to which the electrical wiring 83 is connected. The display control unit 67 displays the position information 78 of the first terminal 21 on the third area 64c of the screen of the display part 64. The position information 78 of the first terminal includes the address of the first terminal 21 specified by the operator.

Next, the operator selects a symbol which corresponds to the position information 78 of the first terminal, among the symbols which are indicative of the devices which are included in the sequence program. In the example presented here, the terminal 21 specified by the operator has the input device 41 of the symbol SEN2 connected thereto. The operator sees the device which is actually connected to the input/output apparatus 1, and can select the symbol in the sequence program. The operator performs an operation of associating the position information 78 of the first terminal 21 with the symbol SEN2. For example, the operator moves his/her finger as indicated by the arrow 91, while maintaining the pressed state of the position information 78 of the first terminal 21. Subsequently, the press on the field of address of the symbol SEN2 is released. The operation detection unit 68 can detect that the position information 78 of the first terminal 21 corresponds to the symbol SEN2 of the input device 41.

Alternatively, as indicated by the arrow 92, the finger is moved to the symbol SEN2 in the sequence program, while maintaining the state in which the position information 78 of the first terminals 21 is pressed by the finger. Subsequently, the finger is released at the position of the symbol SEN2. By this operation, the operation detection unit 68 can detect that the position information 78 of the first terminal 21 is associated with the symbol SEN2 which corresponds to the input device.

The method by which the operator selects a symbol which is indicative of a device is not limited to the above-described method, and an arbitrary method can be employed. For example, by pressing a symbol in the sequence program after the operator has pressed the position information 78 of the first terminal 21, a symbol which is indicative of the device which corresponds to the position information 78 can be selected. Alternatively, by pressing the field of address of symbol in the table of symbols after having pressed the position information 78 of the first terminal 21, a symbol which is indicative of the device which corresponds to the position information 78 can be selected.

The operation detection unit 68 detects a symbol which is indicative of a device which is specified by the operator. The operation detection unit 68 detects a symbol which is indicative of a device which corresponds to the position information 78 of the first terminal 21. In the example illustrated in FIG. 4, the operation detection unit 68 detects the symbol SEN2 as a symbol which is indicative of the device specified by the operator. Subsequently, the setting unit 70 sets, to the symbol which has been detected by the operation detection unit 68, the position of the first terminal 21 which is included in the position information 78 of the first terminal 21. Here, an address X80.0 is set to the device bearing the symbol SEN2. The display control unit 67 displays, on the field of address of the symbol SEN2, an address which is included in the position information 78.

As described above, in the first program generation method of the present embodiment, the position of the first terminal which is included in the position information of the first terminal allocated to the symbol which is indicative of the device selected by the operator. The operator, after having performed the operation of connecting the electrical wiring, can set the address, which corresponds to the connected device, to the sequence program.

The operator repeatedly performs the above-described operation on all the first terminals 21 to which the second terminals 81 are connected. In other words, the above-described operation is performed on all the first terminals 21 to which the input devices 41 and the output devices 42 are connected. When the operator presses a button next to the first terminal 21 to which a device to which an address is allocated is connected, the position information 76 of the first terminal 21 is displayed on the display part 64. It is then possible to allocate the position of the first terminal 21 by associating the position information 78 of the first terminal with a symbol which is indicative of the device which is included in the sequence program.

By setting the address of all the symbols which are included in the sequence program, the sequence program can be completed. The completed sequence program can be transmitted to the controller 2.

In the first generation method of the control program of the present embodiment, the operator can perform allocation of address of the first terminals 21 after having connected the electrical wiring 83 to the input/output apparatus 1. The operator can perform the task of connecting the device without minding the address of the first terminal 21 in the input/output apparatus 1. Therefore, the operator can perform connection while avoiding entanglement or twisting of a plurality of the electrical wirings 83. Furthermore, the connection task of the electrical wirings 83 can be performed so that the electrical wirings 83 are arranged in alignment. In addition, it is possible to perform the task of connecting electrical wirings in a short time.

Figure 5:
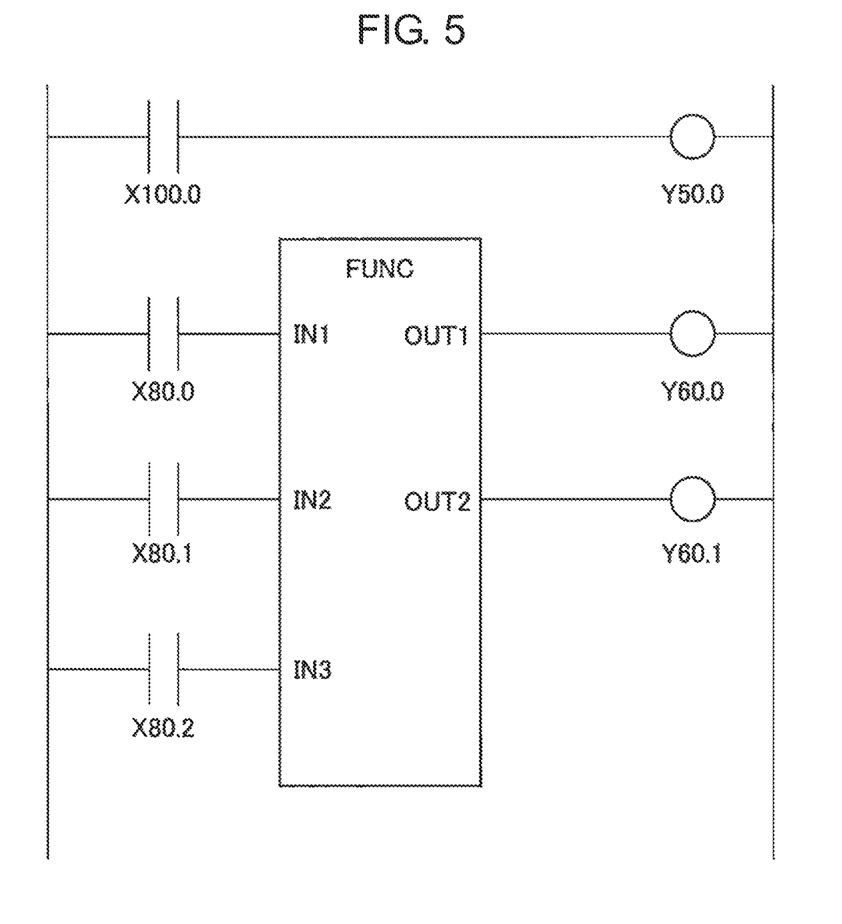
FIG. 5 is a sequence program in a comparative example.
Figure 6:
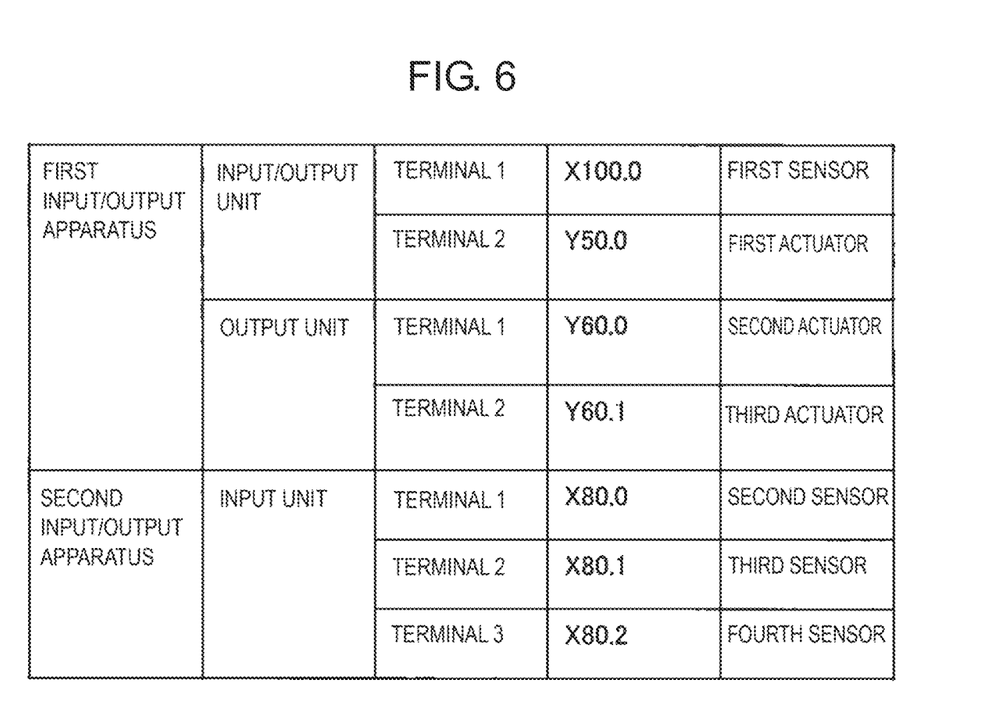
FIG. 6 is a table indicating a correspondence between addresses of input/output apparatuses and devices which are connected thereto in the comparative example.

FIG. 5 illustrates a sequence program of comparative example. FIG. 6 illustrates a list of addresses which are set to the sequence program of the comparative example. With reference to FIG. 5 and FIG. 6, in the sequence program of the comparative example, the operator has previously specified an address (a symbol such as X100.0) for each device in the sequence program. In addition, as illustrated in FIG. 6, the operator has determined a device to be connected to each of the first terminals.

In a method of the comparative example, the operator performs a task of connecting a second terminal to first terminals of the input/output apparatus, based on the completed sequence program and the list of addresses. In the method of the comparative example, since the positions of the terminal to which each device is connected is predetermined, there is a risk that the task of connecting the electrical wiring is difficult, or a plurality of wirings may get entangled.

For example, a first sensor is specified so as to be connected to the first terminal of the input/output unit whose address is X100.0. The first sensor must necessarily be connected to this terminal. In addition, a first actuator is specified to be connected to the second terminal of the input/output unit. The first actuator must necessarily be connected to this terminal. As a result of connecting the electrical wiring, there is a problem that the position of the terminal cannot be changed, even when the position of the electrical wiring becomes complicated.

In contrast, in the first generation method of the control program of the present embodiment, each device is connected to the input/output apparatus 1 before setting the address in the sequence program. After all the devices have been connected to the input/output apparatus 1, the address of the first terminal 21 is set to the symbol which is indicative of the device in the sequence program. Therefore, the task of connecting electrical wirings can be performed without taking into account the address of the first terminal. It is possible to easily perform the task of connecting the electrical wiring, and also prevent the electrical wiring from being arranged in a complicated manner. In particular, a large number of devices are arranged inside the control panel. Inside the control panel, a large number of electrical Wirings are also arranged and therefore positions of the electrical wirings may become complicated. However, the method of the present embodiment allows for preventing the position of the electrical wiring from becoming complicated inside the control panel.

Now, with reference to FIG. 4, the position information 76 of the first terminal in the present embodiment includes information of a device connected to the first terminal 21. As information of the device, there may be exemplified manufacturer, model/spec, individual number, or the like. In addition, as information of the device, there may be exemplified type of device, interface, rated voltage, or the like.

The device connected to the first terminal 21 in the present embodiment is formed so that information relating to the device can be transmitted. The input device 41 and the output device 42 are formed so that information relating to the device can be transmitted to the input/output apparatus 1 by being connected to the input/output apparatus 1. The control unit 37 of each of the units 12, 13, and 14 communicates with the devices 41 and 42 which are connected to the first terminals 21. The control unit 37 acquires information relating to the device connected to the terminal 21 corresponding to the button 22 to be pressed. The control unit 37 acquires information such as manufacturer, model/spec, type, or the like, from the devices 41 and 42.

The control unit 37 can transmit, to the arithmetic processing device 61, the position information of the first terminal 21 including the address of the first terminal 21 which corresponds to the button 22 which has been pressed by the operator and information of the device. The terminal detection unit 69 detects the position information of the first terminals 21. The display control unit 67 can display the information of the device together with the address of the terminal 21 on the display part 64. By employing this control, the operator can grasp the information of the device of the specified terminal on the screen. With reference to the device information, it is possible to easily select a symbol in the sequence program.

The position information 78 of the first terminal 21 in the present embodiment includes the address as the position of the first terminal 21 of the input/output apparatus 1. In other words, the position of the first terminal 21 is specified by the address, but the embodiment is not limited to this. The position of the first terminal 21 can be specified in any format.

For example, individual numbers of the input unit 12, the output unit 13, or the input/output unit 14, and the information of the positions of the terminals for each of the units may be used. The positions of the terminals 21 for the units 12, 13, and 14 can be specified in descending order of the first terminals 21. For example, the position of the terminal can be specified in a manner such as the third terminal 21 from the top. By employing this control, the terminal detection unit 69 can identify the position of the first terminal according to the individual numbers of the units and the order of the terminals, even when the order of arrangement of the input unit 12, the output unit 13, and the input/output unit 14 is changed. The operator can generate the control program even when the order of the input unit 12, the output unit 13, and the input/output unit 14 is interchanged after having connected the second terminals 81 to the first terminals 21. In this case, instead of addresses, the individual numbers and the order of the first terminals can be displayed on the table of symbols. Subsequently, the addresses of the terminals 21 of the respective units 12, 13, and 14 can be set, and the program generation unit 66 can convert the individual numbers and the order of the first terminals into the addresses of the first terminals.

In the present embodiment, the arithmetic processing device 61 acquires, from the controller 2, a sequence program for which no address has been set, but the embodiment is not limited to this. The operator may generate the sequence program in the arithmetic processing device 61 from the beginning, and allocate the address at the end.

In the present embodiment, the position information 78 of the first terminal 21 is transmitted from the input/output apparatus 1 to the mobile device 4 via the controller 2, but the embodiment is not limited to this. A device may be employed, which transmits the position information 78 of the first terminal 21 directly to the mobile device 4 from the input/output apparatus 1. For example, the mobile device 4 can be connected to the input/output apparatus 1 via a communication line. Alternatively, the position information 78 of the first terminal 21 can be transmitted from the input/output apparatus 1 to the mobile device 4 via wireless communication. For wireless communication, there may be employed communication via radio wave, optical wireless communication, or acoustic wave communication. As a device for performing optical wireless communication, a device for transmitting information by flickering of an LED (Light Emitting Diode), for example, can be employed. As a device for performing acoustic wave communication, a device that transmits Morse signals via acoustic wave can be employed, for example.

In the above-described embodiment, the control program is a ladder diagram, but the embodiment is not limited to this. In other words, the control program is formed by a diagram, but the embodiment is not limited to this. The control and method of the present embodiment can also be applied to the control program formed in a text format.

Figure 7:
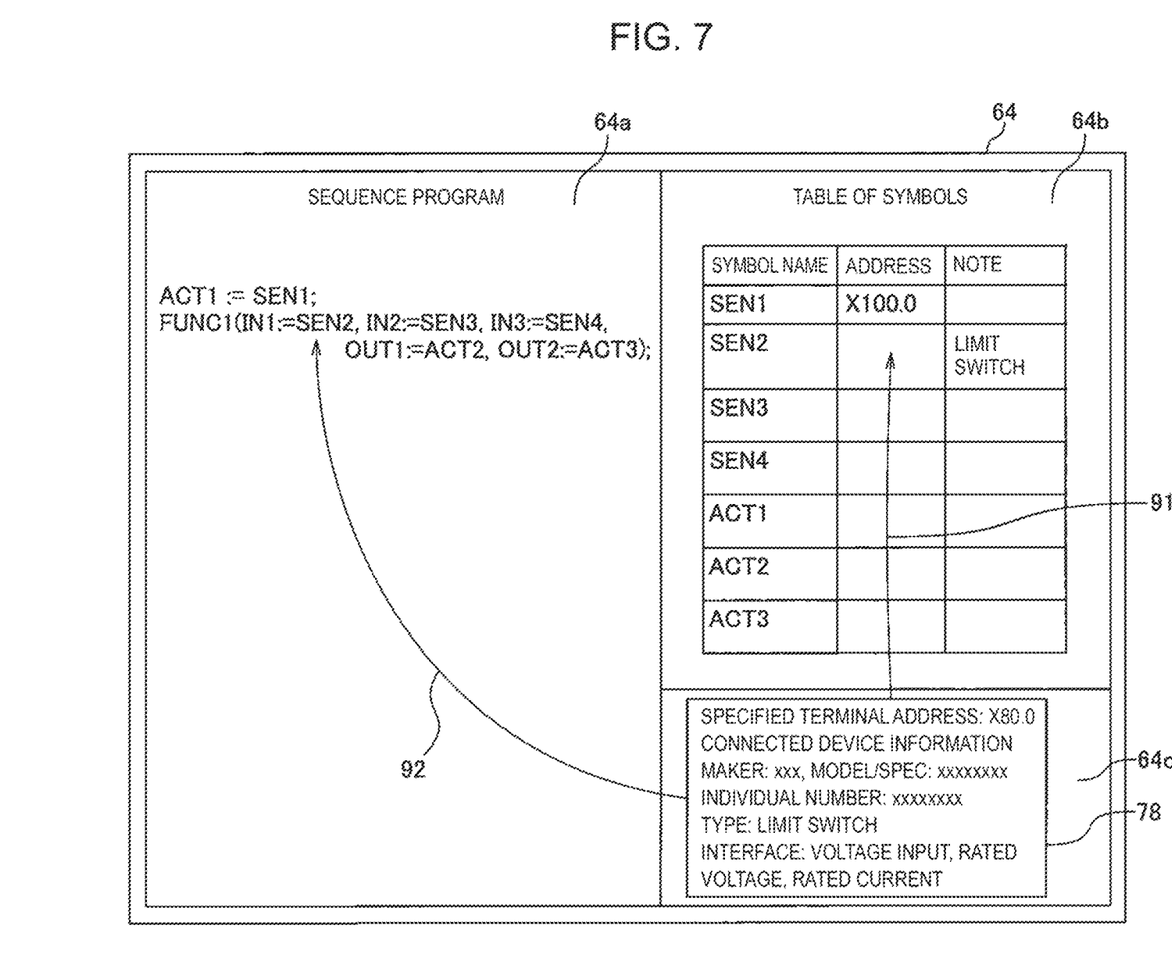
FIG. 7 is a second screen which is displayed on the display part of the mobile device.

FIG. 7 illustrates another example of the screen of the display part of the arithmetic processing device. In the example illustrated in FIG. 7, the sequence program is generated in ST language. In the area 64a of the screen of the display part 64, a structured text written in ST language is displayed as the control program. In addition, the area 64b has a table of symbols displayed thereon. Also in the control program described in such a text format, the operator can associate the position information 78 of the first terminal 21 with the symbol SEN2 described in the control program, by performing an operation of moving his/her finger as indicated by the arrow 91 or the arrow 92. Besides the foregoing, there may be exemplified, as the control program, a function block diagram written in FBD language, an instruction list written in IL language, or the like.

Next, a second program generation apparatus and a second generation method of the control program in the present embodiment will be described. The configuration of the second program generation apparatus is similar to the first program generation apparatus 7 (see FIG. 3).

Figure 8:
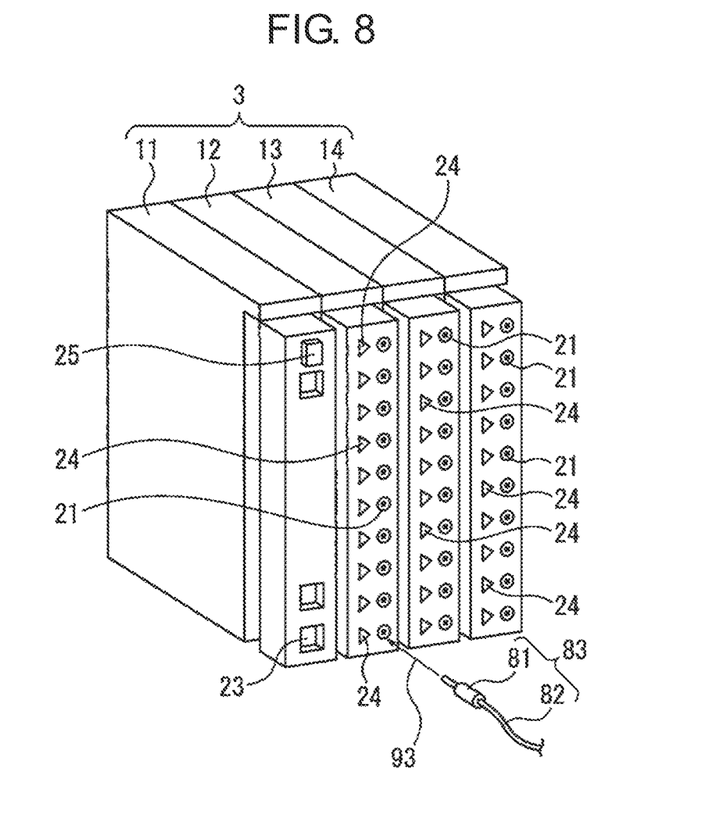
FIG. 8 is a perspective view of a second input/output apparatus according to an embodiment.

FIG. 8 illustrates a second input/output apparatus used for the second program generation method of the present embodiment. A second input/output apparatus 3 includes a button 25 formed on the interface unit 11. In the second generation method of the control program, the position of the first terminals 21 in the control program is allocated each time one of the second terminals 81 is inserted into the first terminal 21. The device which is connected to the first terminal 21 is formed so that it can transmit information relating to the device.

With reference to FIG. 2, FIG. 3, and FIG. 8, the operator presses the button 25 before connecting the desired electrical wiring 83. The control unit 37 of the input unit 12, the output unit 13, and the input/output unit 14 acquires information relating to the devices connected to all the terminals 21. Information relating to the device is acquired from the terminal 21 to which the device is connected. The control unit 37 transmits, to the arithmetic processing device 61, position information including the address and information relating to the device of the terminal 21. The storage part 62 of the arithmetic processing device 61 stores information relating to the device together with the address of the terminal.

Next, the operator inserts the second terminal 81 into the desired first terminal 21 as indicated by the arrow 93. Subsequently, the operator presses the button 25. The control unit 37 of the input unit 12, the output unit 13, and the input/output unit 14 acquires information of the devices connected to all the terminals 21. The control unit 37 transmits information relating to the device together with the address to the arithmetic processing device 61. The storage part 62 stores the received information.

The terminal detection unit 69 of the program generation unit 66 compares the information relating to the device acquired when the button is pressed before the second terminal 81 is connected, and the information relating to the device acquired when the button 25 is pressed after the second terminal 81 has been connected. The terminal detection unit 69 determines the position of the first terminal 21 for which the information relating to the device is newly acquired to be the position of the first terminal 21 to which the second terminal 81 is connected in the operation performed this time. In other words, the terminal detection unit 69 can determine the first terminal 21, for which acquisition of the information relating to the device failed when the button was pressed for the first time and acquisition of the information relating to the device succeeded when the button was pressed for the second time, to be the first terminal 21 which is connected this time. The display control unit 67 displays, on the display part 64, the position information 78 of the first terminal, which includes the address of the first terminal 21 which is connected this time.

Note that, in the present embodiment, the program generation unit 66 is notified, by pressing the button 25, of the time before connecting the second terminal 81 and the time after connecting the second terminal 81, but the embodiment is not limited to this. The program generation unit 66 can acquire, by an arbitrary control, the time before connecting the second terminal 81 and the time after connecting the second terminals 81. For example, the display control unit 67 can display a button on the screen. By the operator's pressing this button, the program generation unit 66 may discriminate the time before connecting the second terminal and the time after connecting the second terminal 81.

The operator can perform, as with the first program generation apparatus and the first generation method of the control program, a task of associating the position information 78 of the first terminal displayed on the display part 64 with the symbol which is indicative of the device in the control program. By adopting this control, the operator can allocate the address of the first terminal to the symbol which is described in the control program each time the second terminal is connected. The operator can connect any device to the desired first terminal.

Other configurations, actions and effects are similar to the first program generation apparatus and the first generation method of the control program, and therefore description thereof will not be repeated here.

Figure 9:
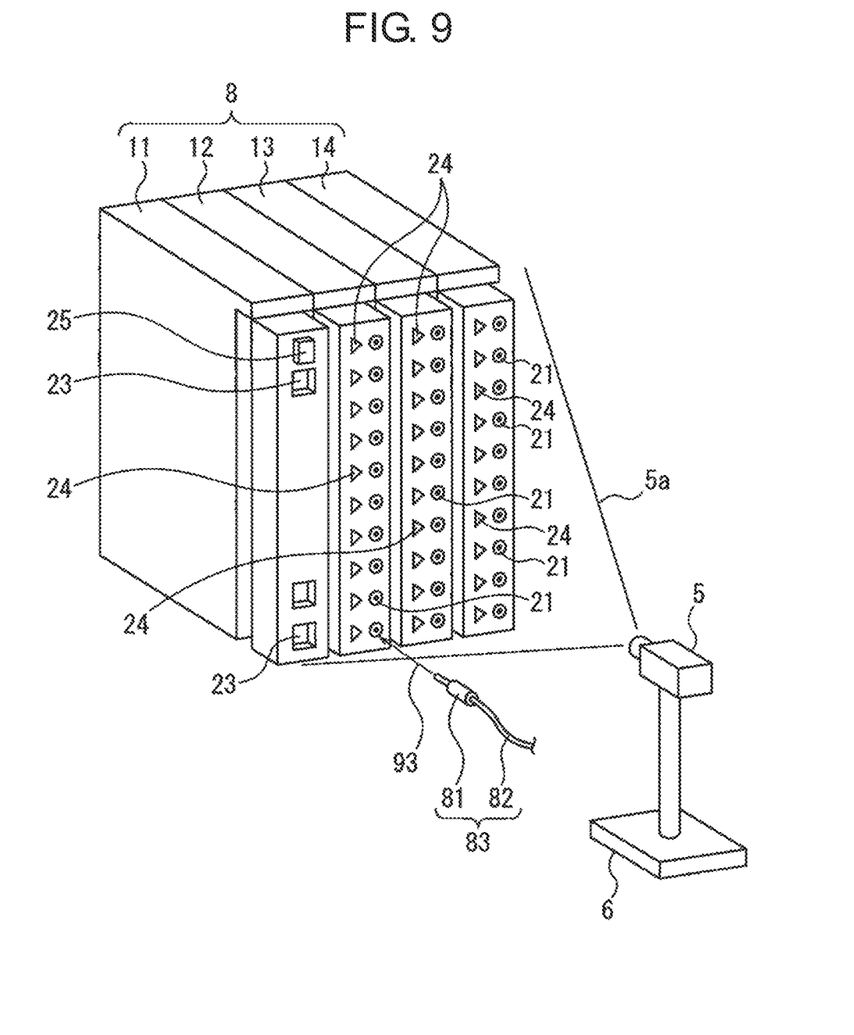
FIG. 9 is a perspective view of a third input/output apparatus according to an embodiment.
Figure 10:
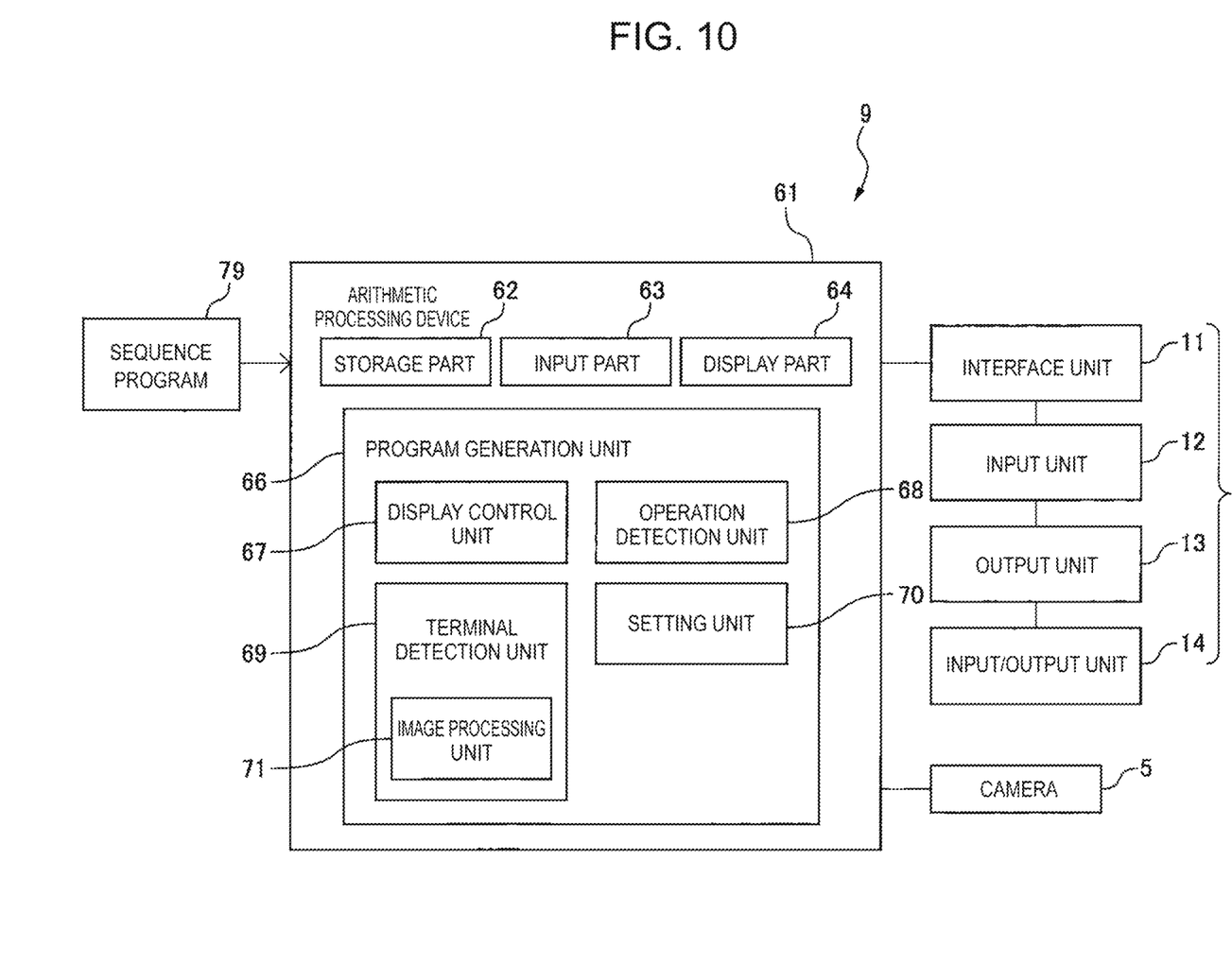
FIG. 10 is a block diagram of a third program generation apparatus according to an embodiment.

FIG. 9 illustrates a perspective view of an input/output apparatus and a camera for implementing the generation method of a third control program in the present embodiment. FIG. 10 illustrates a block diagram of a third program generation apparatus in the present embodiment. With reference to FIG. 9 and FIG. 10, in a third program generation apparatus 9, the control for detecting the first terminal 21 to which the second terminal 81 is connected is different from the second program generation apparatus.

The third program generation apparatus 9 includes a camera 5 as a vision sensor for capturing an image of the terminal 21 of a third input/output apparatus 8. The camera 5 of the present embodiment is a two-dimensional camera. The camera 5 is supported by a platform 6. The camera 5 captures an image in an image capturing area 5a. The camera 5 of the present embodiment is formed so as to capture an image of all of the first terminals 21 of the input/output apparatus 8. Alternatively, the camera 5 may be formed so as to capture an image of some of the first terminals 21 that perform a task, among the plurality of first terminals 21. The image captured by the camera 5 can be transmitted to the arithmetic processing device 61 by an arbitrary communication method. For example, the image captured by the camera 5 can be transmitted to the arithmetic processing device 61 via a communication line.

The terminal detection unit 69 of the program generation unit 66 includes an image processing unit 71. The image processing unit 71 has a function of processing an image of the camera 5. The image processing unit 71 corresponds to a processor which is driven in accordance with an operation program which is stored in the storage part 62. By reading the operation program and performing the control defined in the operation program, the processor functions as the image processing unit 71.

The camera 5 captures an image at a timepoint before connecting the second terminal 81 to one of the first terminals 21. In addition, an image at a timepoint after having connected the second terminal 81 to one of the first terminals 21 is captured. The image processing unit 71 of the present embodiment determines the lighting state of indicator lights 24 in the image captured by the camera 5.

The third input/output apparatus 8 has the indicator lights 24 formed thereon so as to correspond to the first terminals 21. The indicator lights 24 are formed in a one-to-one correspondence with the first terminals 21. The indicator light 24 of the present embodiment turns off when the second terminal 81 is connected to the first terminal 21. In addition, the indicator light 24 turns on when the second terminal 81 is not connected to the first terminal 21. The camera 5 of the present embodiment is formed so as to capture an image of all of the indicator lights 24. Alternatively, the camera 5 may be formed so as to capture, among the plurality of indicator lights 24, an image of the indicator lights 24 which correspond to some of the first terminals 21 to which the operation is performed.

The operator presses the button 25 before connecting one of the second terminals 81 to the first terminal 21. The program generation unit 66 captures, by the camera 5, an image at a timepoint before the second terminal 81 is connected. The storage part 62 stores this image. The operator presses the button 25 after having connected the second terminal 81 to the first terminal 21. The program generation unit 66 captures, by the camera 5, an image at a timepoint after the second terminal 81 has been connected. The storage part 62 stores this image.

The image processing unit 71 detects the first terminals 21 to which the second terminal 81 is connected, based on the image captured by the camera 5, The information of address for each of the first terminals in the image captured by the camera. 5 is preliminarily stored in the storage part 62. The image processing unit 71 can detect the position of the indicator light 24 by a template matching method, for example, and determine whether or not the indicator light 24 is lit, based on the brightness in the image. The image processing unit 71 detects the indicator light 24 which is lit in the image captured for the first time, but is turned off in the image captured for the second time. The addresses of the first terminals 21 which correspond to the positions of each of the indicator lights 24 are preliminarily stored in the storage part 62. The image processing unit 71 can detect the address of the first terminal 21 which corresponds to the indicator light 24, based on the position of the indicator light 24.

Accordingly, in the third program generation apparatus, the image processing unit 71 of the terminal detection unit 69 can detect the position of the first terminal 21 to which the second terminal 81 is connected, based on the image at a timepoint before connecting the second terminal 81 and the image at a timepoint after the second terminal 81 has been connected.

The image processing unit of the present embodiment determines whether or not the second terminal is connected by detecting the state of the indicator light, but the embodiment is not limited to this. The image processing unit can determine the connection status of the second terminal by an arbitrary control. For example, the image processing unit may detect the second terminal in the image, and determine the first terminal to which the second terminal is connected and the first terminal to which the second terminal is not connected.

Other configurations, actions, and effects are similar to the first program generation apparatus, the second program generation apparatus, the first generation method of the control program, and the second generation method of the control program, and therefore explanation is not repeated here.

According to an aspect of the present disclosure, it is possible to provide a generation method of a control program, a program generation apparatus, and an electric device used for the generation method of the control program for preventing electrical wirings to be connected to an input/output apparatus from being arranged in a complicated manner.

The above-described embodiments can be combined as appropriate. In each of the above figures, the same or mutually equivalent portions are denoted by the same reference signs. Note that the above-described embodiments are merely examples and are not intended to limit the invention. Further, the embodiments encompass modifications of the embodiments set forth in the claims.

The invention claimed is:

1. A generation method of a control program by which a controller performs control of a machine via an input/output apparatus, the method comprising:
  connecting, by an operator, a second terminal of an electrical wiring to at least one first terminals of the input/output apparatus;
  detecting, by an arithmetic processing device, position information including a position of one of the first terminals to which the second terminal is connected;
  displaying, on a display part, by the arithmetic processing device, position information of the first terminal, and at least one of the control program and a table of symbols indicative of devices included in the control program;
  selecting, by the operator, a symbol indicative of the device corresponding to the position information of the first terminal, among the symbols indicative of the devices included in the control program; and
  allocating, by the arithmetic processing device, the position of the first terminal included in the position information of the first terminal to the symbol indicating the device selected by the operator.

2. A program generation apparatus configured to generate a control program for performing control by using an input/output apparatus configured to perform at least one of an input of a signal and an output of a signal, comprising an arithmetic processing device including a display and an input device configured to accept an operation performed by an operator on a screen of the display, the arithmetic processing device configured to communicate with the input/output apparatus, wherein the input/output apparatus includes a plurality of first terminals to each of which a second terminal of an electrical wiring is connected, the arithmetic processing device includes a processor configured to:

detect an operation performed by the operator on the input device, control the display, detect position information including a position of one of the first terminals of the input/output apparatus to which the electrical wiring is connected, and set a position of the first terminal to which a device indicated in the control program is connected, and the processor is further configured to:

control the display to display at least one of the control program and a table of symbols indicating the devices included in the control program, and the position information of the first terminal detected by the processor, detect a symbol corresponding to the position information of the first terminal and indicating the device specified by the operator, and allocate the position of the first terminal included in the position information of the first terminal to the symbol indicating the device detected by the processor.

3. The program generation apparatus according to claim 2, wherein the position information of the first terminal includes an address as the position of the first terminal of the input/output apparatus.

4. The program generation apparatus according to claim 2, wherein the position information of the first terminal includes, as the position of the first terminal of the input/output apparatus, an individual number of an electric device included in the input/output apparatus and information of a position of a terminal in the electric device.

5. The program generation apparatus according to claim 2, wherein the position information of the first terminal includes information relating to a device connected to the input/output apparatus.

6. The program generation apparatus according to claim 2, wherein the input/output apparatus includes a plurality of buttons arranged in a manner corresponding to each of the first terminals, and is configured to transmit, to the program generation apparatus, a signal generated by pressing one of the buttons, and the processor is further configured to detect, by receiving the signal generated by pressing one of the buttons, a position of a first terminal to which a second terminal is connected.

7. The program generation apparatus according to claim 2, comprising a vision sensor configured to capture an image of the input/output apparatus, wherein the vision sensor is configured to capture a first image at a first timepoint before connecting the second terminal to one first terminal, and a second image at a second timepoint after having connected the second terminal, and the processor is further configured to detect the position of the first terminal to which the second terminal is connected, based on the first image at the first timepoint before connecting the second terminal and the second image at the second timepoint after having connected the second terminal.

8. The program generation apparatus according to claim 2, wherein the device connected to the first terminal is configured to transmit information relating to the device, the processor is further configured to:

compare information relating to the device acquired before connecting the second terminal with information relating to the device acquired after connecting the second terminal, and detect a position of the first terminal at which information relating to the device is newly acquired as the position of the first terminal to which the second terminal has been connected.

* * * * *